United States Patent
Liu et al.

(10) Patent No.: US 10,613,783 B2
(45) Date of Patent: Apr. 7, 2020

(54) TECHNIQUES FOR MANAGING DATA WHICH IS ACCESSIBLE BY MULTIPLE STORAGE PROCESSORS

(71) Applicant: EMC IP Holding Company LLC, Hopkinton, MA (US)

(72) Inventors: Yousheng Liu, Beijing (CN); Jian Gao, Beijing (CN); Xinlei Xu, Beijing (CN); Lifeng Yang, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 15/955,055

(22) Filed: Apr. 17, 2018

(65) Prior Publication Data

US 2018/0300076 A1 Oct. 18, 2018

(30) Foreign Application Priority Data

Apr. 17, 2017 (CN) .......................... 2017 1 0250539

(51) Int. Cl.
*G06F 3/06* (2006.01)

(52) U.S. Cl.
CPC ............ *G06F 3/0637* (2013.01); *G06F 3/061* (2013.01); *G06F 3/0622* (2013.01); *G06F 3/0659* (2013.01); *G06F 3/0683* (2013.01); *G06F 3/065* (2013.01)

(58) Field of Classification Search
CPC ...... G06F 3/0604; G06F 3/061; G06F 3/0622; G06F 3/0637; G06F 3/065; G06F 3/0659; G06F 3/0683; G06F 12/1458
See application file for complete search history.

(56) References Cited

U.S. PATENT DOCUMENTS

| | | | |
|---|---|---|---|
| 6,745,258 B1 * | 6/2004 | Pellegrino | G06F 3/0607 710/107 |
| 6,842,829 B1 * | 1/2005 | Nichols | G06F 11/2089 711/114 |
| 6,865,157 B1 | 3/2005 | Scott et al. | |
| 7,627,779 B2 | 12/2009 | Fair | |
| 8,549,230 B1 * | 10/2013 | Chatterjee | G06F 3/0608 711/113 |
| 9,037,793 B1 | 5/2015 | O'Brien et al. | |
| 9,053,027 B1 | 6/2015 | Harvey et al. | |
| 9,298,636 B1 | 3/2016 | O'Brien et al. | |
| 9,323,671 B1 | 4/2016 | Harvey et al. | |
| 9,530,442 B1 * | 12/2016 | Hassner | G06F 11/0727 |

* cited by examiner

*Primary Examiner* — Larry T Mackall
(74) *Attorney, Agent, or Firm* — BainwoodHuang

(57) ABSTRACT

Embodiments of the present disclosure relate to a method, device and computer readable medium for managing storage. The method comprises: in response to obtaining, at a first storage processor, an access request for a storage unit, determining whether the storage unit is currently accessible, the storage unit including at least one storage area. The method further comprises: in response to the storage unit being currently inaccessible, determining whether the first storage processor has an access right to the storage unit. In addition, the method further comprises: in response to the first storage processor having no access right, requesting a second storage processor for the access right, the second storage processor being associated with a mirror storage unit of the storage unit, and the first and second storage processors having exclusive write access rights.

20 Claims, 8 Drawing Sheets

TECHNIQUES FOR MANAGING DATA WHICH IS ACCESSIBLE BY MULTIPLE STORAGE PROCESSORS

RELATED APPLICATIONS

This application claim priority from Chinese Patent Application Number CN201710250539.6, filed on Apr. 17, 2017 at the State Intellectual Property Office, China, titled "METHOD, APPARATUS, AND COMPUTER READABLE STORAGE MEDIUM FOR STORAGE MANAGEMENT" the contents of which is herein incorporated by reference in its entirety.

FIELD

Embodiments of the present disclosure generally relate to managing storage, and specifically to a method and device for allocating an access right to a storage unit among a plurality of storage processors.

BACKGROUND

In a dual controller storage system, there are two controllers which are referred to as storage processors to provide a storage service to a host. Usually, cache mirroring technology is employed to ensure security of data in the cache. The principle of the cache mirroring lies in mirroring the data in the caches between two storage processors, that is to say, the data in the caches of the two storage processors are backed up to each other. It is challenging to allocate an access right to the data in the caches among two or more storage processors to implement unified management of the storage system.

SUMMARY

Embodiments of the present disclosure provide a method, device and computer readable medium for managing storage.

According to a first aspect of the present disclosure, there is provided a method of managing storage. The method comprises: in response to obtaining, at a first storage processor, an access request for a storage unit, determining whether the storage unit is currently accessible, the storage unit including at least one storage area; in response to the storage unit being currently inaccessible, determining whether the first storage processor has an access right to the storage unit; and in response to the first storage processor having no access right, requesting a second storage processor for the access right, the second storage processor being associated with a mirror storage unit of the storage unit, and the first and second storage processors having exclusive write access rights.

According to a second aspect of the present disclosure, there is provided a method of managing storage. The method comprises: in response to obtaining, at a first storage processor, a request for an access right to a storage unit of the first storage processor from a second storage processor, determining whether to permit the access right requested by the second storage processor to be granted or not currently, the storage unit including at least one storage area, the second storage processor being associated with a mirror storage unit of the storage unit, and the first and second storage processors having exclusive write access rights; in response to permitting the requested access right to be granted, updating an access right indicator based on the request, the access right indicator indicating an access right of the first storage processor to the storage unit; and sending, to the second storage processor, a response indicating that the requested access right is granted.

According to a third aspect of the present disclosure, there is provided a device for managing storage. The device comprises at least a processing unit and at least one memory. The at least one memory is coupled to the at least one processing unit and stores instructions executed by the at least one processing unit. The instructions, when executed by the at least one processing unit, cause the device to perform acts including: in response to obtaining, at a first storage processor, an access request for a storage unit, determining whether the storage unit is currently accessible, the storage unit including at least one storage area; in response to the storage unit being currently inaccessible, determining whether the first storage processor has an access right to the storage unit; and in response to the first storage processor having no access right, requesting a second storage processor for the access right, the second storage processor being associated with a mirror storage unit of the storage unit, and the first and second storage processors having exclusive write access rights.

According to a fourth aspect of the present disclosure, there is provided a device for managing storage. The device comprises at least a processing unit and at least one memory. The at least one memory is coupled to the at least one processing unit and stores instructions executed by the at least one processing unit. The instructions, when executed by the at least one processing unit, cause the device to perform acts including: in response to obtaining, at a first storage processor, a request for an access right to a storage unit of the first storage processor from a second storage processor, determining whether to permit the access right requested by the second storage processor to be granted or not currently, the storage unit including at least one storage area, the second storage processor being associated with a mirror storage unit of the storage unit, and the first and second storage processors having exclusive write access rights; in response to permitting the requested access right to be granted, updating an access right indicator based on the request, the access right indicator indicating an access right of the first storage processor to the storage unit; and sending, to the second storage processor, a response indicating that the requested access right is granted.

According to a fifth aspect of the present disclosure, there is provided a computer-readable storage medium. The computer-readable storage medium has computer-readable program instructions stored thereon, these computer-readable program instructions, when executed by a processing unit, causing the processing unit to perform any step of the method according to the above first aspect.

According to a sixth aspect of the present disclosure, there is provided a computer-readable storage medium. The computer-readable storage medium has computer-readable program instructions stored thereon. The computer-readable program instructions, when executed by a processing unit, causing the processing unit to perform any step of the method according to the above second aspect.

Summary of the Invention is provided to introduce a selection of concepts in a simplified form, and they will be further described in Detailed Description of Embodiments below. The Summary of the Invention is not intended to identify key features or essential features of the present disclosure, nor is it intended to limit the scope of the present disclosure.

BRIEF DESCRIPTION OF THE DRAWINGS

Through a more detailed description of example embodiments of the present disclosure in the accompanying drawings, the above and other advantages, features, and objects of the present disclosure will become more apparent, in which in the example embodiments of the present disclosure, the same reference signs usually denote the same parts.

In all figures, the same or corresponding reference signs denote the same or corresponding parts.

DETAILED DESCRIPTION OF EMBODIMENTS

Preferred embodiments of the present disclosure will be described in more detail below with reference to figures. Although the figures show preferred embodiments of the present disclosure, it should be appreciated that the present disclosure may be implemented in various forms and should not be limited by embodiments illustrated here. On the contrary, these embodiments are provided to enable more thorough and complete understanding of the present disclosure, and completely convey the scope of the present disclosure to those skilled in the art As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment". Terms such as "first" and "second" may refer to different or identical objects. The text below might include other explicit and implicit definitions.

Figure 1:
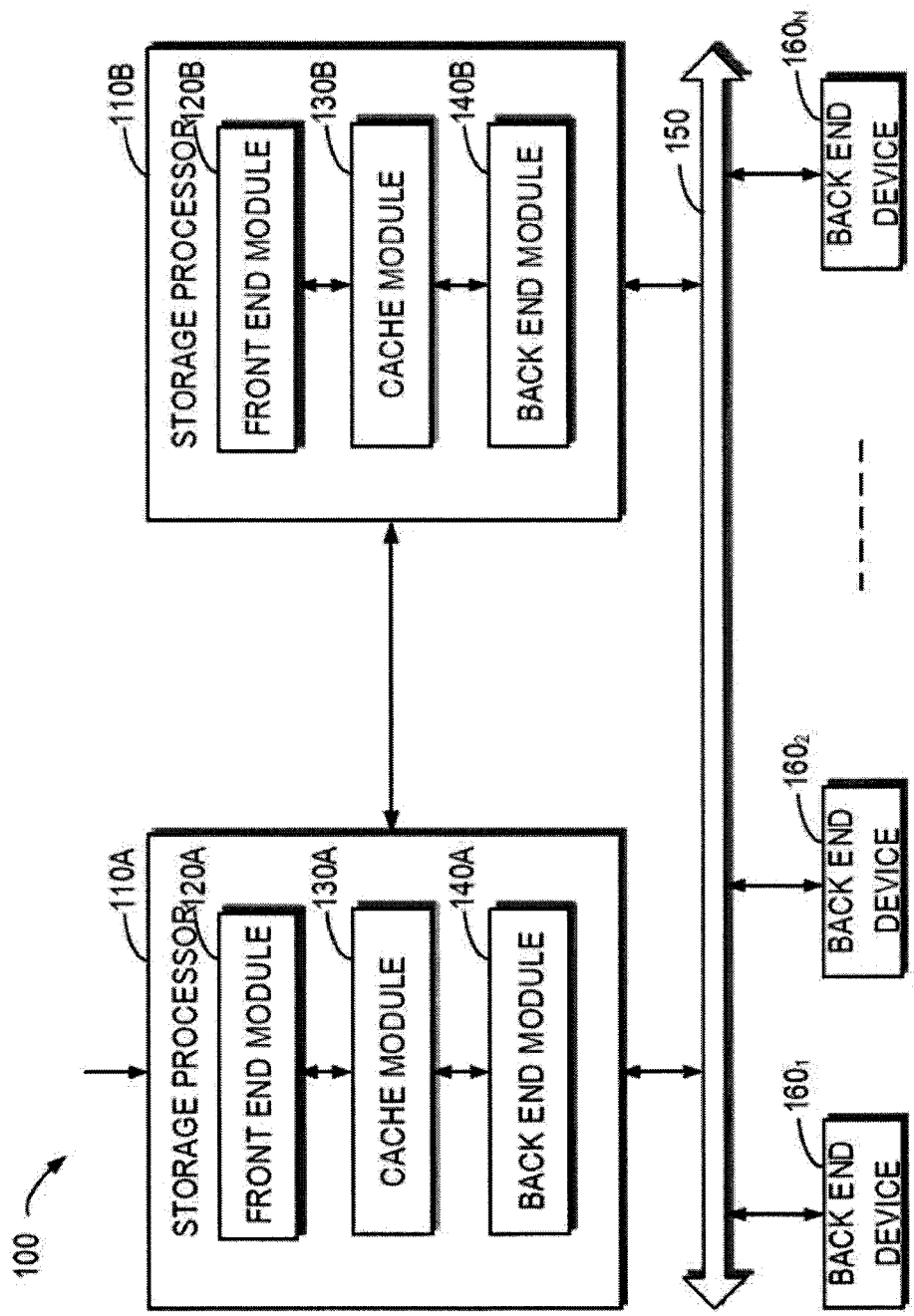
FIG. 1 illustrates a schematic diagram of an example of a storage system 100.

FIG. 1 illustrates a schematic diagram of an example of a storage system 100. As shown in FIG. 1, the storage system 100 may include: storage processors 110A and 110B (hereinafter collectively referred to as storage processor 110), a bus 150 and back end device $160_1$-$160_N$ (hereinafter collectively referred to as back end device 160). The storage processor 110 and back end device 160 may be connected via the bus 150. The back end device 160 may be any non-volatile storage medium currently known or to be developed in the future, for example, magnetic disk, solid state disk (SSD), magnetic disk array or the like.

An application may run individually in the storage processors 110A and 110B. The storage processors 110A and 110B may be connected to each other to exchange data to implement cache mirroring. The storage processor 110A may include a front end module 120A, a cache module 130A and a back end module 140A which are connected to each other, and the storage processor 110B may include a front end module 120B, a cache module 130B and a back end module 140B which are connected to each other.

The front end modules 120A and 120B (hereinafter collectively referred to as front end module 120) may respond to a data transmission request from a front end device (e.g., a host). When the front end device writes data to the storage system 100, the front end module 120 may receive a write access request and data to be written from the front end device. In addition, when the front end device reads data from the storage system 100, the front end module 120 may send a read acknowledgement and the requested data to the front end device.

The cache modules 130A and 130B (hereinafter collectively referred to as cache module 130) may improve read/write performance. When the data is written into the storage system 100, the data may not be directly written into the back end device 160. On the contrary, the data may be temporarily cached in the cache module 130 (e.g., DRAM), and then the storage system 100 may send a write acknowledgement to the front end device. Then, the storage system 100 may flush the data in the cache module 130 to the back end device 160 via the back end module 140 at proper time. In addition, when the data is read from the storage system 100, the data is previously read from the back end device 160 to the cache module 130 via the back end module 140 so that the storage system 100 may return the requested data from the cache module 130.

As stated above, since the storage system 100 includes more than one storage processor 110 and employs the cache mirroring technology, the data in the cache module of one storage processor will be mirrored to the cache module of a peer storage processor in the write operation. For example, when the data is written into the cache module 130A of the storage processor 110A, the data will be mirrored to the cache module 130B of the storage processor 110B. After the storage processor 110A receives a response of completion of mirroring from the storage processor 110B, the storage processor 110A sends a write acknowledgement to the front end device.

In addition, in the read operation, for example, when data is read from the cache module 130A of the storage processor 110A, the storage processor 110A determines whether there exists the requested data in the local cache module 130A. If there exists, the data is returned from the cache module 130A. If there does not exist, the storage processor 110A determines whether there exists the requested data in the cache module 130B of the peer storage processor 110B. If the requested data exists in the cache module 130B, the storage processor 110A mirrors the data in the cache module 130B to the cache module 130A, and the data is returned from the cache module 130A. In the case that the requested data does not exist in both of the two cache modules 130A and 130B, the storage processor 110A uploads the data from the back end device 160, and stores the data in the cache module 130A, and then the data is returned from the cache module 130A.

Figure 2:
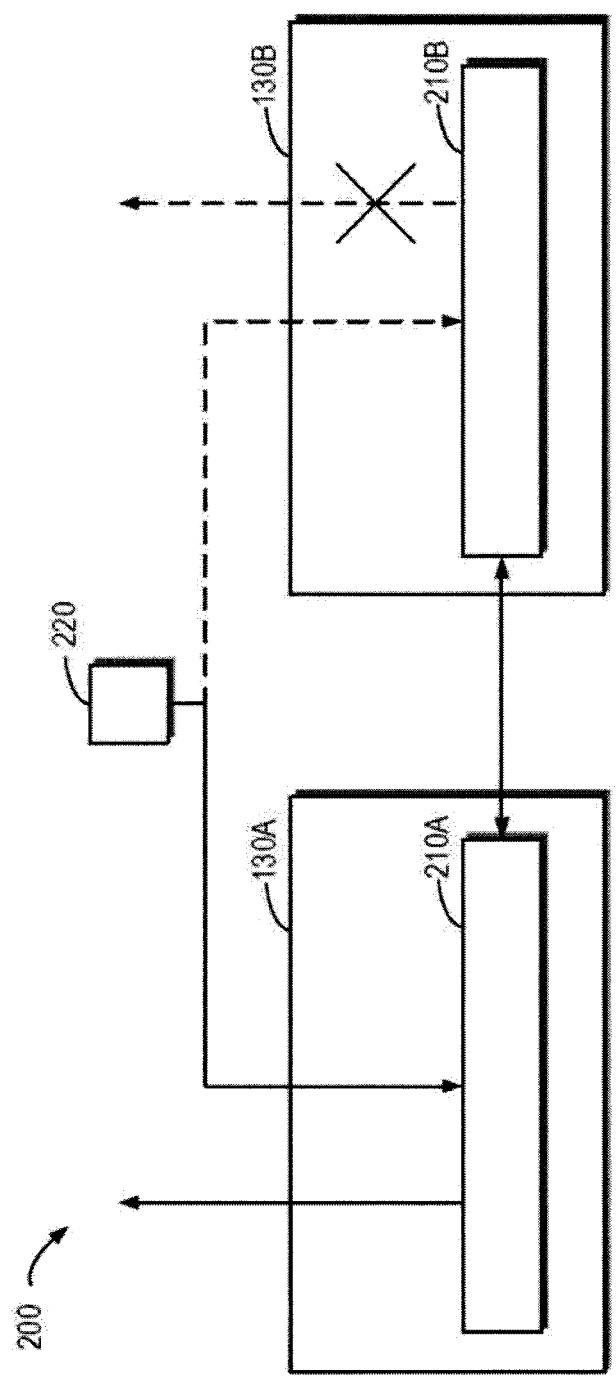
FIG. 2 illustrates a schematic diagram of an example of a cache system 200.

However, existence of more than one storage processor 110 in the storage system 100 might cause the following consequence: if there are more than one access request to simultaneously access data and the mirror of the data, consistency of the data of the storage system 100 might be affected. To avoid this situation, it is necessary to determine whether the data is currently accessible before accessing the data. FIG. 2 illustrates a schematic diagram of an example of the cache system 200 for determining whether the data is currently accessible.

As shown in FIG. 2, the cache system 200 may be used as the cache modules 130A and 130B shown in FIG. 1. The cache module 130A may include at least one storage unit 210A, and the storage module 130B may include at least one storage unit 210B (the storage units 210A and 210B are hereinafter collectively referred to as storage unit 210). The storage unit 210 is an example of a management unit of the cache module 130. As an example, the storage unit 210 may manage 64 KB data.

The cache system 200 may further include at least one access indicator 220 corresponding to the storage unit 210. The access indicator 220 may indicate whether the data is currently accessible. For example, before the storage processor 110A accesses the storage unit 210A, the storage processor 110A determines whether the storage unit 210A is accessible via the access indicator 220. In the case that the storage unit 210A is accessible, the storage processor 110A accesses the storage unit 210A, and the access indicator 220 is updated to indicate that the storage unit 210 is current inaccessible. In this case, if the peer storage processor 110B intends to access the storage unit 210B as the mirror of the storage unit 210A, the storage processor 110B determines that the storage unit 210B is inaccessible via the access indicator 220. Hence, the storage processor 110B's access to the storage unit 210B is rejected.

However, as the access indicator 220 indicates accessibility of the whole storage unit, accessibility conflicts would be very serious for access to small data. A large number of accessibility conflicts would substantially decrease the input/output performance of the storage system 100.

Conventionally, to reduce the accessibility conflicts caused by the access to small data, the cache system 200 usually employs Share Write technology and Virtual Reference technology.

The principle of the Share Write technology is that the write access request for the storage unit 210 is a Share Write access request. It permits more than one write access request to simultaneously write data into the storage unit and its peer storage unit. A precondition for employing the Share Write technology lies in that the front end module 120 may process the access request, so that there does not exist a read or write access request to a storage unit and its peer storage unit before a previous write access request for the storage unit is completed.

The principle of the Virtual Reference technology lies in creating a copy of the storage unit 210. For a read access request, if the previous request makes the storage unit 210 currently inaccessible, a virtual storage unit is created and the data of the storage unit 210 is copied to the virtual storage unit. The subsequent access to the storage unit 210 will proceed in the virtual reference unit. For a write access request, if the previous request makes the storage unit 210 currently inaccessible, a virtual storage unit is created, and the data is written into the virtual storage unit. After the previous request releases the storage unit 210, the data in the virtual storage unit will be merged into the storage unit 210.

However, the above two technologies are disadvantageous. The disadvantage of the Share Write technology lies in the potential data corruption. For example, in the case that the front end module 120 intends to simultaneously perform a write access to the storage unit and the peer storage unit, the data in the storage unit might be mixed by two write accesses, and therefore the data is corrupted.

The disadvantage of the Virtual Reference technology lies in the performance issue. As stated above, in the case that the Virtual Reference technology is used, the data is copied to the virtual storage unit or the data is copied from the virtual storage unit. The data copying will consume central the processing unit (CPU) resource and the memory band width, and reduce the performance of the storage system.

The root cause of the above disadvantages lies in the method of determining whether the data is currently accessible, and the size of the data accessed. If there does not exist an accessibility conflict or there exist very few accessibility conflicts, Share Write technology and Virtual Reference technology will not be needed any more.

To at least partially solve the above issues and one or more of other potential issues, example embodiments of the present disclosure propose a solution for processing data. The solution uses a current accessibility indicator and an access right indicator for the storage unit, to avoid the serious accessibility conflict and the potential data corruption. In addition, according to the solution, when the storage processor does not have a write access right, the data is written into a temporary storage unit, thereby reducing data copying. Hence, the method may be used to allocate the access right to the data in the cache among two or more storage processors, thereby implementing unified management of the storage system and improving the performance and reliability of the storage system.

Figure 3:
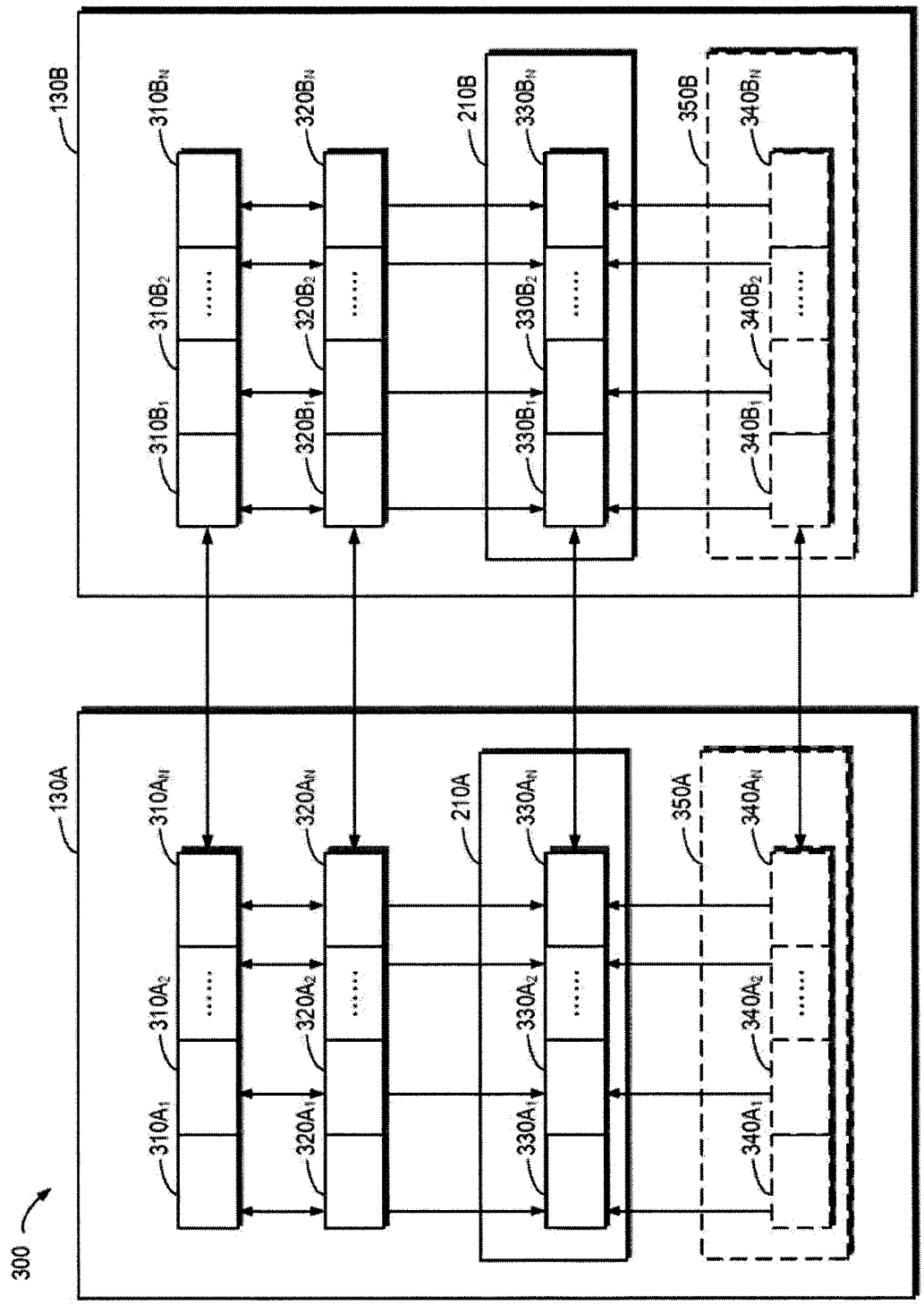
FIG. 3 illustrates a schematic diagram of an example of a cache system 300 according to an embodiment of the present disclosure.

FIG. 3 illustrates a schematic diagram of an example of a cache system 300 according to an embodiment of the present disclosure. It should be appreciated that the structure and function of the storage system 300 shown in FIG. 3 are only used for illustration purpose, not to imply any limitation to the scope of the present disclosure. Embodiments of the present disclosure may be reflected in different structures and/or functions.

The cache system 300 may be used as the storage modules 130A and 130B shown in FIG. 1. Like what is shown in FIG. 2, the cache modules 130A and 130B may include at least one storage unit 210A and 210B, respectively. As stated above, the storage unit 210 may serve as the management unit of the cache module 130. Different from FIG. 2, the storage units 210A and 210B may include at least one storage area $330A_1$-$330A_N$ and $330B_1$-$330B_N$ (hereinafter collectively referred to as storage area 330), respectively. As an example, the storage unit 210 may include 128 storage areas 330. In addition, like the cache modules 130A and 130B, the storage units 210A and 210B are mirrored to each other, and the storage areas $330A_1$-$330A_N$ and $330B_1$-$330B_N$ are also mirrored to each other.

In addition, the storage units 210A and 210B may further include at least one access right indicator $310A_1$-$310A_N$ and $310B_1$-$310B_N$ (hereinafter collected referred to as access right indicator 310) corresponding to the at least one storage area $330A_1$-$330A_N$ and $330B_1$-$330B_N$, respectively, at least one current accessibility indicator $320A_1$-$320A_N$ and $320B_1$-$320B_N$ (hereinafter collectively referred to as current accessibility indicator 320), and at least one temporary storage area $340A_1$-$340A_N$ and $340B_1$-$340B_N$ (hereinafter collected referred to as temporary storage area 340).

The access right indicator 310 may indicate the local storage processor 110's access right to the storage area 330, to allocate the access right between the local and the peer storage processors 110. To ensure data consistency, the local and the peer storage processors 110 have exclusive write access rights. The current accessibility indicator 320 may indicate whether the storage area 330 is currently accessible. The temporary storage area 340 may be used to temporarily store the data to be written. Similar to the storage units 210A and 210B, the temporary storage units 350A and 350B may serve as the management units of the temporary storage areas $340A_1$-$340A_N$ and $340B_1$-$340B_N$. It is noted that the temporary storage area 340 is created only when the local storage processor 110 obtains the write access request, but has no access right to the storage area 330.

With the access right indicator 310 and the current accessibility indicator 320, it is unnecessary to allocate and notify the access right between the local and the peer storage processors 110 for each access to the storage area 330. The local storage processor 110 requests the peer storage processor 110 for the access right only when the local storage processor 110's access right indicator 310 indicates that the local storage processor 110 does not have the access right to the storage area 330 as requested by the obtained access request.

As an example, when the access right indicator 310A indicates that the local storage processor 110A does not have the access right to the storage area 330A as requested by the obtained access request, the local storage processor 110A may request the peer storage processor 110B for the access right. After the storage processor 110B obtains the request for the access right, the storage processor 110B may change its access right indicator 310B, and may send the storage processor 110A a response indicating that the access right is granted.

Types of the access request may include the write access request (also referred to as exclusive access request) and the read access request (also referred to as shared access request). The access right indicator 310 may indicate the write access right, the read access right and no access right. The current accessibility indicator 320 may indicate currently write-accessible, currently read-accessible and currently inaccessible.

The value of the current accessibility indicator 320 depends on the value of the access right indicator 310 and the type of the ongoing access request. In some embodiments, if the access right indicator 310 of the local storage processor 110 indicates no access right, the current accessibility indicator 320 of the local storage processor 110 may only indicate currently inaccessible.

If the access right indicator 310 of the local storage processor 110 indicates the read access right, the current accessibility indicator 320 of the local storage processor 110 may indicate currently read-accessible or currently inaccessible. Currently read-accessible means that there does not exist an access request for the storage area 330 or there exists at least one ongoing read access request. Currently inaccessible means that there exists at least one write access request for the storage area 330 to wait to be executed.

If the access right indicator 310 of the local storage processor 110 indicates the write access right, the current accessibility indicator 320 of the local storage processor 110 may indicate currently write-accessible, currently read-accessible or currently inaccessible. Currently write-accessible means that there does not exist an access request. Currently read-accessible means that there exists at least one ongoing read access request. Currently inaccessible means that there exists one ongoing write access, or there exists at least one ongoing read access request and at least one write access request wait to be executed.

An access request usually simultaneously accesses multiple storage areas 330, in this case, the access rights may be simultaneously allocated to the storage areas 330. That is to say, the access rights are simultaneously allocated to all storage areas 330 for an access request, and there does not exist the case in which the access rights are allocated to a part of the storage areas 330. This may improve the performance of the storage system, and avoid dead lock resulted in the access requests waiting for each other.

In some embodiments, in the case that the storage unit 210 serves as the management unit, the storage unit 210 may serve as an allocation unit of the access right. For example, as stated above, the storage unit 210 may comprise 128 storage areas. Since the access right indicator 310 and the current accessibility indicator 320 may respectively indicate three states, which may be represented by two bits, respectively. Therefore, the access right indicator 310 and the current accessibility indicator 320 for one storage unit 210 may be represented by 128*2=256, respectively. In this case, the operation for the access right indicator 310 and the current accessibility indicator 320 may be implemented using a bitmap.

It can be seen from the above description that embodiments of the present disclosure can use the current accessibility indicator and the access right indicator for the storage areas, to avoid the serious accessibility conflict and the potential data corruption. In addition, according to embodiments of the present disclosure, when the local storage processor does not have the write access right, the data can be written into the temporary storage unit, thereby reducing data copying. Hence, according to embodiments of the present disclosure, it is feasible to allocate the access right to the data in the caches among two or more storage processors, thereby implementing unified management of the storage system and improving the performance and reliability of the storage system.

Embodiments of the present disclosure will be further described in conjunction with a cache system 300 shown in FIG. 3. As stated above, to implement unified management of the storage system and improve the performance and reliability of the storage system, embodiments of the present disclosure propose using the current accessibility indicator, access right indicator and temporary storage unit for the storage areas to allocate the access right to data in the caches among two or more storage processors.

Figure 4:
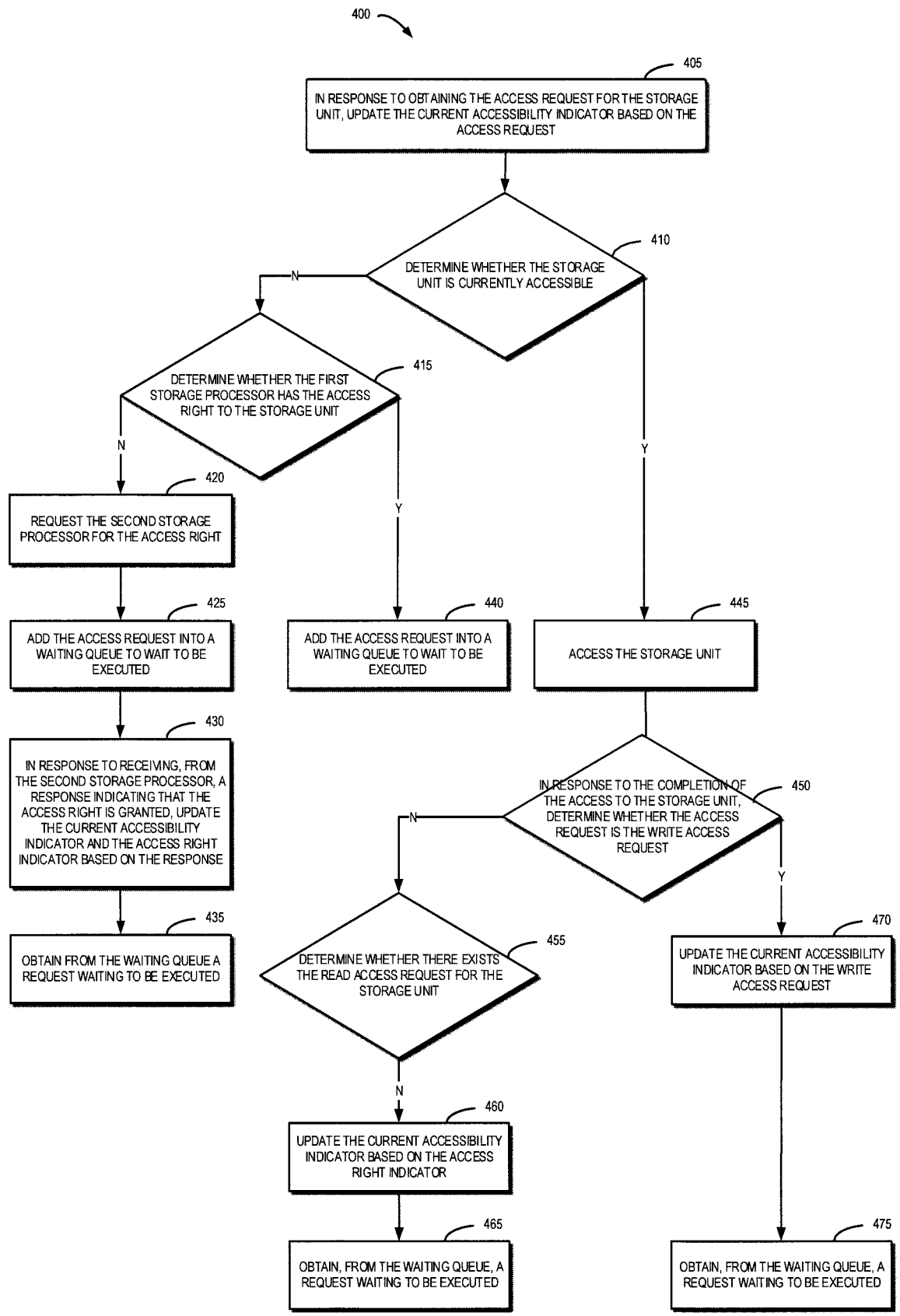
FIG. 4 illustrates a flow chart of a method 400 of processing data according to an embodiment of the present disclosure.

FIG. 4 illustrates a flow chart of a method 400 for processing data according to an embodiment of the present disclosure. Without loss of generality, the method 400 is described with respect to the storage processor 110A, for example. In addition, the method 400 may further include additional acts not shown and/or may omit shown acts. The scope of the present disclosure is not limited in this aspect.

At 405, the storage processor 110A, in response to obtaining the access request for the storage unit 210A, updates the current accessibility indicator 320A based on the access request. As stated above, the storage unit 210A is a management unit of the storage system, and the act executed for the storage unit 210A is executed for the storage area 330A.

In some embodiments, the storage processor 110A may update the current accessibility indicator 320A based on the access request and the value of the current accessibility indicator 320A. If the access request is the write access request, the current accessibility indicator 320A is set as currently inaccessible, no matter whether the current accessibility indicator 320A indicates currently write-accessible or currently read-accessible. When the current accessibility indicator 320A indicates currently read-accessible, the purpose of setting the current accessibility indicator 320A as currently inaccessible is to prevent possible subsequent read access.

If the access request is the read access request and the current accessibility indicator 320A indicates currently write-accessible, the current accessibility indicator 320A is set as currently read-accessible to indicate the existence of the ongoing read access. In addition, if the current accessibility indicator 320A indicates currently inaccessible, the access to the storage area 330A is not allowed, and therefore it is unnecessary to update the current accessibility indicator 320A.

At 410, the storage processor 110A determines whether the storage area 330A is currently accessible. In some embodiments, the storage processor 110A determines whether the storage area 330A is currently accessible via the current accessibility indicator 320A. When the current accessibility indicator 320A indicates currently write-accessible, the write access request and the read access request are both permitted. When the current accessibility indicator 320A indicates currently read-accessible, the read access request is permitted whereas the write access request is rejected. When the current accessibility indicator 320A indicates currently inaccessible, both the write access request and read access request are rejected.

If the storage area 330A is currently inaccessible, at 415 the storage processor 110A determines whether the storage processor 110A has the access right to the storage area 330A. In some embodiments, the storage processor 110A determines whether the storage processor 110A has the access right to the storage area 330A via the access right indicator 310A. When the access right indicator 310A indicates the write access right, both the write access right and the read access request are permitted. When the access right indicator 310A indicates the read access right, the read access request is permitted whereas the write access request is rejected. When the access right indicator 310A indicates the absence of the access right, both the write access request and the read access request are rejected.

If the storage processor 110A does not have the access right, at 420, the storage processor 110A requests the storage processor 110B for the access right. In some embodiments, in the case that the access request is the write access request, the storage processor 110A further obtains data to be written. In this case, the storage processor 110A creates a temporary storage area 340A and writes the data to be written to the temporary storage area 340A. In addition, the storage processor 110A further sends the data to be written to the storage processor 110B. Furthermore, at 425, the storage processor 110A adds the access request into a waiting queue to wait to be executed.

At 430, in response to receiving, from the storage processor 110B, a response indicating that the access right is granted, the storage processor 110A updates the current accessibility indicator 320A and the access right indicator 310A based on the response. In some embodiments, the storage processor 110A may set the current accessibility indicator 320A and the access right indicator 310A as the access right returned by the response. For example, when the storage processor 110B returns the write access right, the read access right and no access right, respectively, the current accessibility indicator 320A is set as currently write-accessible, currently read-accessible and currently inaccessible, respectively, and the access right indicator 310A is set as the write access right, the read access right and no access right, respectively.

In addition, at 435, the storage processor 110A obtains from the waiting queue a request waiting to be executed. In some embodiments, the storage processor 110A may determine whether the request waiting to be executed is permitted. If the request is permitted, the request is executed. Otherwise, the storage processor 110A may put the request back to the waiting queue, and obtain a subsequent request waiting to be executed. Returning to 415, if the storage processor 110A has the access right, at 440, the storage processor 110A adds the access request into a waiting queue to wait to be executed.

Furthermore, returning to 410, if it is determined that the storage area 330A is currently accessible, at 445, the storage processor 110A accesses the storage area 330A. In some embodiments, in the case that the access request is the write access request, the storage processor 110A writes the data to be written from the temporary storage area 340A to the storage area 330A.

Conventionally, the storage processor 110A first requests the storage processor 110B for the access right, and after receiving the response indicating that the access right is granted, sends to the storage processor 110B the data to be written for storage area mirroring, and the storage processor 110A completes the write procedure until the storage processor 110A receives from the storage processor 110B a response of completion of mirroring. However, according to example embodiments of the present disclosure, writing the data to be written into the temporary storage area 340A may simultaneously implement the request for the write access right and the storage area mirroring, thereby improving the performance of the storage system.

At 450, in response to the completion of the access to the storage area 330A, the storage processor 110A determines whether the access request is the write access request. If the access request is not the write access request, at 455, the storage processor 110A determines whether there exists the read access request for the storage area 330A.

If there does not exist the read access request for the storage area 330A currently, at 460, the storage processor 110A updates the current accessibility indicator 320A based on the access right indicator 310A. For example, in the case that the access right indicator 310A is the write access right, the read access right and no access right, respectively, the current accessibility indicator 320A may be set as currently write-accessible, currently read-accessible and currently inaccessible, respectively. In addition, at 465, the storage processor 110A obtains, from the waiting queue, a request wait to be executed.

Returning to 450, if the access request is the write access request, at 470, the storage processor 110A updates the current accessibility indicator 320A based on the write access request. In some embodiments, the current accessibility indicator 320A is set as the currently write-accessible. In addition, at 475, the storage processor 110A obtains a request waiting to be executed from the waiting queue.

Figure 5:
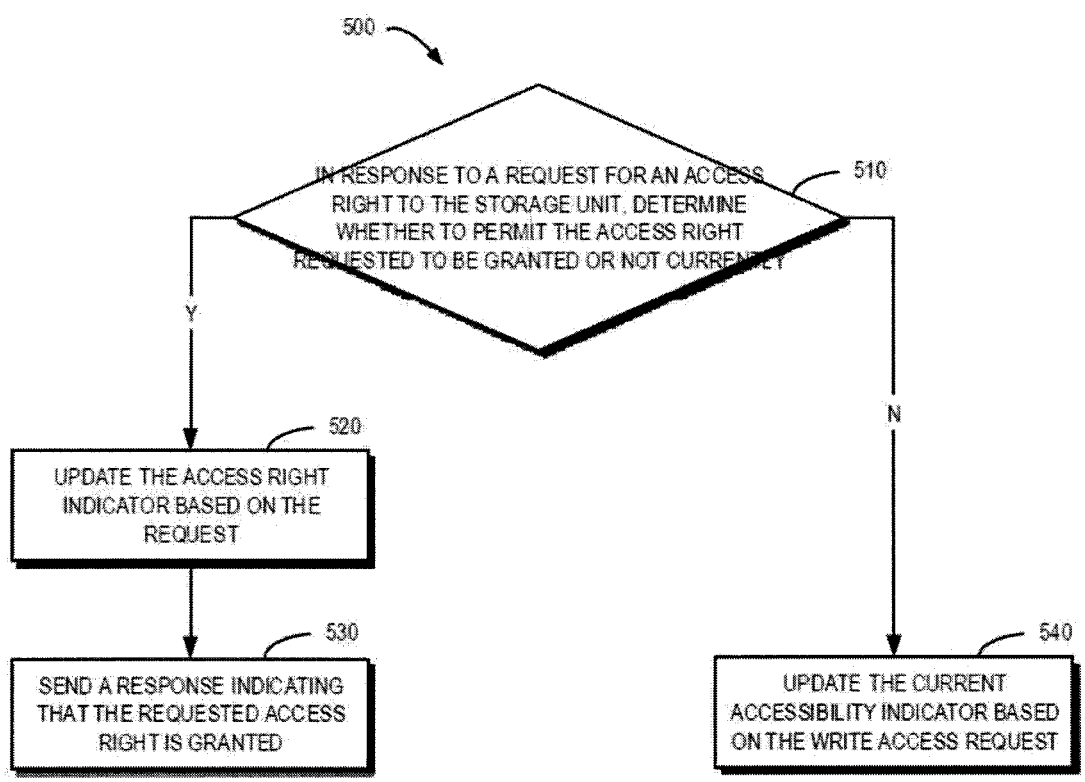
FIG. 5 illustrates a flow chart of a method 500 of processing data according to an embodiment of the present disclosure.

FIG. 5 illustrates a flow chart of a method 500 for processing data according to an embodiment of the present disclosure. Without loss of generality, the method 500 is described with respect to the storage processor 110B, for example. In addition, the method 500 may further include additional acts not shown and/or may omit shown acts. The scope of the present disclosure is not limited in this aspect.

At 510, in response to obtaining, at the storage processor 110B, a request for the access right to the storage unit 210B of the storage processor 110B from the storage processor 110A, the storage processor 110B determines whether to permit the access right requested by the storage processor 110A to be granted or not currently. As stated above, the storage unit 201B is the management unit of the storage system, and the act executed for the storage unit 210B is executed for the storage area 330B. In some embodiments, in the case that the storage processor 110A requests the storage processor 110B for the write access right, the storage processor 110B further receives the data to be written from the storage processor 110A. The storage processor 110B creates a temporary storage area 340B to write the data to be written into the temporary storage area 340B.

If the requested access right is permitted to be granted, at 520, the storage processor 110B updates the access right indicator 310B based on the request. In some embodiments, if the storage processor 110A requests the storage processor 110B for the write access right, the storage processor 110B sets the access right indicator 310B as no access right. In this case, in some embodiments, the storage processor 110B writes the data to be written from the temporary storage area 340B into the storage area 330B. In addition, if the storage processor 110A requests the storage processor 110B for the read access right, the storage processor 110B sets the access right indicator 310B as the read access right.

At 530, the storage processor 110B sends to the storage processor 110A a response indicating that the requested access right is granted. Returning to 510, if the grant of the requested access right is not permitted, the storage processor 110B adds the request into the waiting queue to wait to be executed.

It can be seen from the above description that embodiments of the present disclosure can use the current accessibility indicator and the access right indicator for the storage area, to avoid the serious accessibility conflict and the potential data corruption. In addition, according to the embodiments of the present disclosure, when the local storage processor does not have the write access right, the data is written into the temporary storage unit, thereby reducing data copying. Hence, according to embodiments of the present disclosure, it is feasible to allocate the access right to the data in the caches among two or more storage processors, thereby implementing unified management of the storage system and improving the performance and reliability of the storage system.

Figure 6:
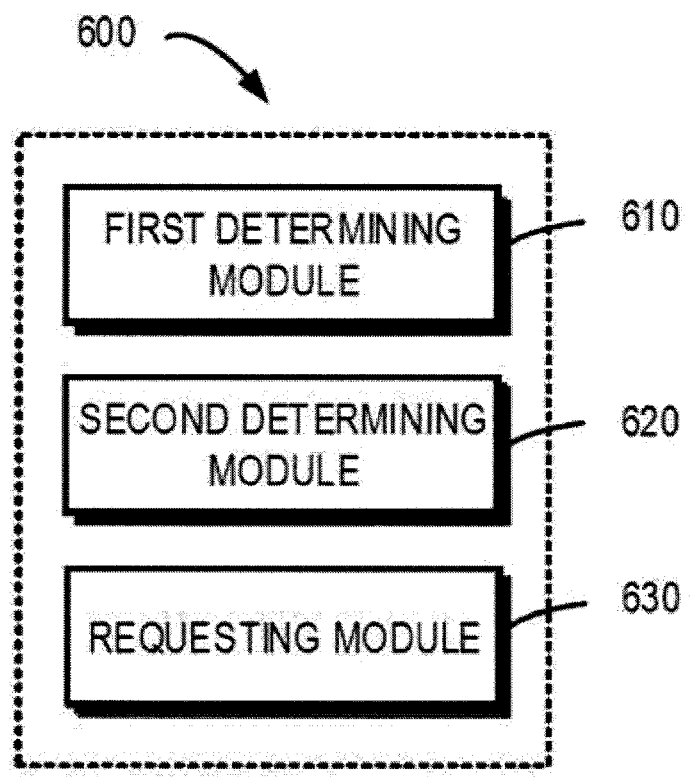
FIG. 6 illustrates a block diagram of an apparatus 600 for processing data according to an embodiment of the present disclosure.

FIG. 6 illustrates a block diagram of an apparatus 600 for processing data according to an embodiment of the present disclosure. For example, any of the storage processors 110A and 110B acting as a requesting party for processing data as shown in FIG. 1 may be implemented by the apparatus 600. As shown in FIG. 6, the apparatus 600 may include a first determining module 610 configured to, in response to obtaining, at the first storage processor, the access request for the storage unit, determine whether the storage unit is currently accessible, the storage unit including at least one storage area. The apparatus 600 may further include a second determining module 620 configured to, in response to the storage unit being currently inaccessible, determine whether the first storage processor has the access right to the storage unit. In addition, the apparatus 600 may further include a requesting module 630 configured to, in response to the first storage processor having no access right, request the second storage processor for the access right, in which the second storage processor is associated with a mirror storage unit of the storage unit, and the first and second storage processors have exclusive write access rights.

Figure 7:
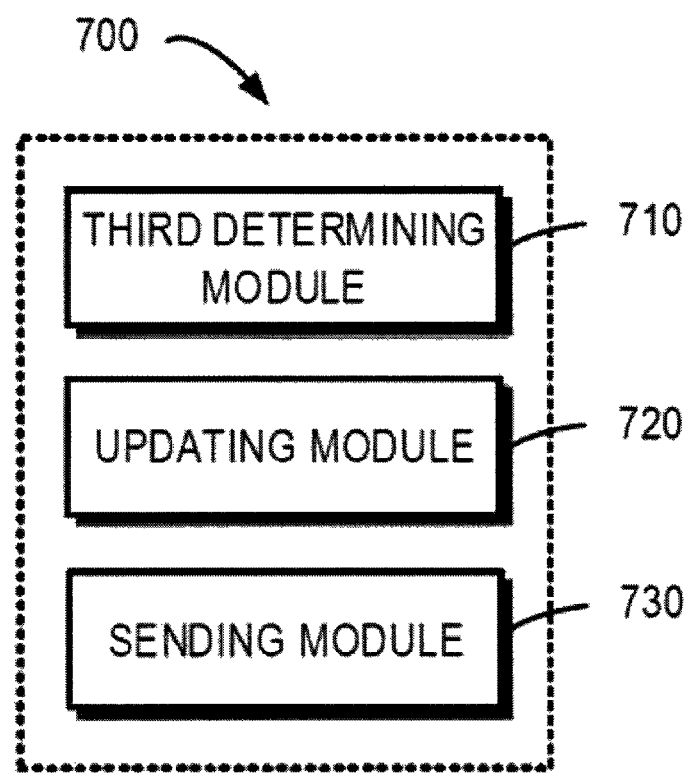
FIG. 7 illustrates a block diagram of an apparatus 700 for processing data according to an embodiment of the present disclosure.

FIG. 7 illustrates a block diagram of an apparatus 700 for processing data according to an embodiment of the present disclosure. For example, any of the storage processors 110A and 110B acting as a requested party for processing data as shown in FIG. 1 may be implemented by the device 700. As shown in FIG. 7, the apparatus 700 may include a third determining module 710 configured to, in response to obtaining, at the first storage processor, a request for an access right to a storage unit of the first storage processor from a second storage processor, determine whether to permit the access right requested by the second storage processor to be granted or not currently, in which the storage unit includes at least one storage area, the second storage processor is associated with the mirror storage unit of the storage unit, and the first and second storage processors have exclusive write access rights. The apparatus 700 may further include an updating module 720 configured to, in response to permitting the requested access right to be granted, update the access right indicator based on the request, the access right indicator indicating an access right of the first storage processor to the storage unit. In addition, the apparatus 700 may further include a sending module 730 configured to send, to the second storage processor, a response indicating that the requested access right is granted.

For the sake of clarity, FIG. 6 and/or FIG. 7 do not show some optional modules of the apparatus 600 and/or apparatus 700. However, it should be appreciated that the features described above with reference to FIGS. 1-5 are also applicable for the apparatus 600 and/or apparatus 700. Furthermore, the various modules of the apparatus 600 and/or 700 may be either hardware modules or software modules. For example, in some embodiments, the apparatus 600 and/or 700 may be implemented partially or completely by software and/or firmware, e.g., implemented as a computer program product embodied on a computer readable medium. Alternatively or additionally, the apparatus 600 and/or 700 may be implemented partially or completely based on hardware, e.g., implemented as an Integrated Circuit (IC), an Application-Specific Integrated Circuit (ASIC), a System On Chip (SOC), a Field Programmable Gate Array (FPGA), and the like. The scope of the present disclosure is not limited in this aspect.

Figure 8:
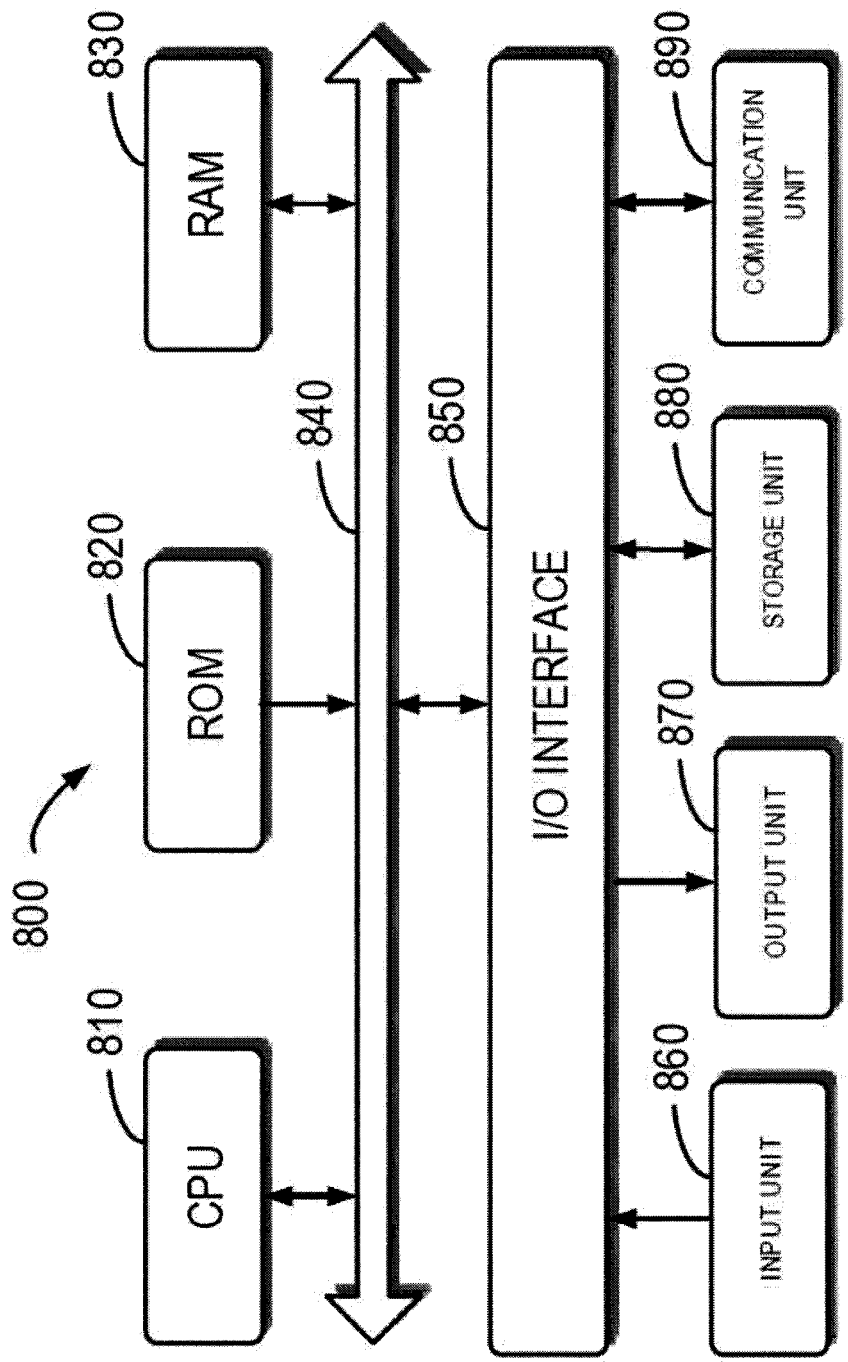
FIG. 8 illustrates a block diagram of an example device 800 that may be used to implement an embodiment of the content of the present disclosure.

FIG. 8 illustrates a schematic block diagram of an example device 800 that may be used to implement embodiments of the present disclosure. For example, any of the storage processors 110A and 110B as shown in FIG. 1 may be implemented by the device 800. For example, the device 800 includes a central processing unit (CPU) 810 which is capable of performing various proper acts and processes in accordance with a computer program instruction stored in a read only memory (ROM) 820 or a computer program instruction loaded from a storage unit 880 to a random access memory (RAM) 830. In the RAM 830, various programs and data needed in the operation of the device 800 may also be stored. The CPU 810, the ROM 820 and the RAM 830 are connected to one another via a bus 840. An input/output (I/O) interface 850 is also connected to the bus 840.

The various components in the device 800 are connected to the I/O interface 850: an input unit 860 including a keyboard, a mouse, or the like; an output unit 870, e.g., various displays and loudspeakers; the storage unit 880 such as a magnetic disk, an optical disk or the like; and a communication unit 890 such as a network card, a modem, a radio communication transceiver. The communication unit 890 allows the device 800 to exchange information/data with other devices via a computer network such as Internet and/or various telecommunication networks.

The above-described methods and processes such as the method 400 and/or the method 500 may be implemented by the processing unit 810. For example, in some embodiments, the method 400 and/or method 500 may be implemented as a computer software program, which is tangibly included in a machine-readable medium such as the storage unit 880. In some embodiments, part or all of the computer program may be loaded and/or installed on the device 800 via the ROM 820 and/or the communication unit 890. When the computer program is loaded to the RAM 830 and executed by the CPU 810, one or more acts of the above method 400 and/or method 500 may be performed.

The present disclosure may be a method, a device, a system, and/or a computer program product. The computer program product may include a computer readable storage medium (or media) having stored thereon computer readable program instructions for performing aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and a conventional procedural programming language, such as the "C" programming language or similar programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, when executed by the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored thereon includes an article of manufacture including instructions which implement aspects of the functions/acts specified in the flowchart and/or block diagram block or blocks.

The computer readable program instructions may also be loaded onto a computer, another programmable data processing apparatus, or another device to cause a series of operational steps to be performed on the computer, other programmable apparatus or other device to produce a computer implemented process, such that the instructions when executed on the computer, other programmable apparatus, or other device perform the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

We claim:

1. A method of managing storage, comprising:
in response to obtaining, at a first storage processor, an access request for a storage unit, determining whether the storage unit is currently accessible, the storage unit including at least one storage area;
in response to the storage unit being currently inaccessible, determining whether the first storage processor has an access right to the storage unit; and
in response to the first storage processor having no access right, requesting a second storage processor for the access right, the second storage processor being associated with a mirror storage unit of the storage unit, and the first and second storage processors having exclusive write access rights;
wherein a current accessibility indicator indicates whether the storage unit is currently accessible, and an access right indicator indicates the access right, the method further comprising:
in response to the storage unit being currently accessible, accessing the storage unit;
in response to the accessing of the storage unit being completed, determining whether the access request is a write access request;
in response to the access request being the write access request, updating the current accessibility indicator based on the write access request; and
obtaining from a waiting queue a request to be executed.

2. The method according to claim 1, further comprising:
adding the access request into the waiting queue to wait to be executed.

3. The method according to claim 1, further comprising:
in response to the first storage processor having the access right, adding the access request into the waiting queue to wait to be executed.

4. The method according to claim 1, wherein determining whether the storage unit is currently accessible comprises:
updating the current accessibility indicator based on the access request; and
determining whether the storage unit is currently accessible.

5. The method according to claim 1, the method further comprising:
in response to receiving, from the second storage processor, another response indicating that the access right is granted, updating the current accessibility indicator and the access right indicator based on the other response; and
obtaining from the waiting queue another request to be executed.

6. The method according to claim 1, wherein the access request is a write access request, and requesting the second storage processor for the access right in response to the first storage processor having no access right comprises:

in response to the first storage processor having no write access right, writing data to be written into a temporary storage unit associated with the storage unit, the temporary storage unit including at least one temporary storage area, and the data to be written being obtained at the first storage processor;
requesting the second storage processor for the write access right; and
sending the data to be written to the second storage processor.

7. The method according to claim 1, wherein the access request is a write access request, the method further comprising:
in response to the storage unit being currently write-accessible, writing data in a temporary storage unit associated with the storage unit into the storage unit, the temporary storage unit including at least one temporary storage area.

8. The method according to claim 1, further comprising:
in response to the access request not being the write access request, determining whether there is existing a read access request for the storage unit;
in response to absence of the read access request for the storage unit, updating the current accessibility indicator based on the access right indicator; and
obtaining from the waiting queue the request to be executed.

9. The method according to claim 1, wherein the first and second storage processors form at least part of a storage system; and
wherein the method further comprises:
receiving, as the access request for the storage unit, a data transmission request from a host which serves as a front end device to the storage system.

10. A method of managing storage, comprising:
in response to obtaining, at a first storage processor, a request for an access right to a storage unit of the first storage processor from a second storage processor, determining whether to permit the access right requested by the second storage processor to be granted or not currently, the storage unit including at least one storage area, the second storage processor being associated with a mirror storage unit of the storage unit, and the first and second storage processors having exclusive write access rights;
in response to permitting the requested access right to be granted, updating an access right indicator based on the request, the access right indicator indicating an access right of the first storage processor to the storage unit; and
sending, to the second storage processor, a response indicating that the requested access right is granted;
wherein a current accessibility indicator indicates whether the storage unit is currently accessible, the method further comprising:
in response to the storage unit being currently accessible, accessing the storage unit;
in response to the accessing of the storage unit being completed, determining whether the access request is a write access request;
in response to the access request being the write access request, updating the current accessibility indicator based on the write access request; and
obtaining from a waiting queue a request to be executed.

11. The method according to claim 10, further comprising:

in response to preventing the requested access right from being granted, adding the request into the waiting queue to wait to be executed.

12. The method according to claim 10, wherein the request is a request for a write access right, the method further comprising:

writing data to be written into a temporary storage unit associated with the storage unit, the temporary storage unit including at least one temporary storage area, and the data to be written being obtained at the first storage processor.

13. The method according to claim 12, wherein updating an access right indicator based on the request in response to permitting the requested access right to be granted comprises:

in response to permitting the requested write access right to be granted, writing the data to be written from the temporary storage unit into the storage unit; and updating the access right indicator based on the requested write access right.

14. A device for managing storage, comprising:

at least a processing unit; and at least one memory coupled to the at least one processing unit and storing instructions executed by the at least one processing unit, the instructions, when executed by the at least one processing unit, causing the device to perform acts including:

in response to obtaining, at a first storage processor, an access request for a storage unit, determining whether the storage unit is currently accessible, the storage unit including at least one storage area;

in response to the storage unit being currently inaccessible, determining whether the first storage processor has an access right to the storage unit; and in response to the first storage processor having no access right, requesting a second storage processor for the access right, the second storage processor being associated with a mirror storage unit of the storage unit, and the first and second storage processors having exclusive write access rights;

wherein a current accessibility indicator indicates whether the storage unit is currently accessible, and an access right indicator indicates the access right; and wherein the acts further include:

in response to the storage unit being currently accessible, accessing the storage unit;

in response to the accessing of the storage unit being completed, determining whether the access request is a write access request;

in response to the access request being the write access request, updating the current accessibility indicator based on the write access request; and obtaining from a waiting queue a request to be executed.

15. The device according to claim 14, wherein the acts further include:

adding the access request into a waiting queue to wait to be executed.

16. The device according to claim 14, wherein the acts further include:

in response to the first storage processor having the access right, adding the access request into the waiting queue to wait to be executed.

17. The device according to claim 14, wherein determining whether the storage unit is currently accessible comprises:

updating the current accessibility indicator based on the access request; and determining whether the storage unit is currently accessible.

18. The device according to claim 14, wherein the acts further include:

in response to receiving, from the second storage processor, another response indicating that the access right is granted, updating the current accessibility indicator and the access right indicator based on the other response; and obtaining from the waiting queue another request to be executed.

19. The device according to claim 14, wherein the access request is a write access request, and requesting the second storage processor for the access right in response to the first storage processor having no access right comprises:

in response to the first storage processor having no write access right, writing data to be written into a temporary storage unit associated with the storage unit, the temporary storage unit including at least one temporary storage area, and the data to be written being obtained at the first storage processor;

requesting the second storage processor for the write access right; and sending the data to be written to the second storage processor.

20. The device according to claim 14, wherein the access request is a write access request, and the acts further include:

in response to the storage unit being currently write-accessible, writing data in a temporary storage unit associated with the storage unit into the storage unit, the temporary storage unit including at least one temporary storage area.

* * * * *